(12) United States Patent
Campbell et al.

(10) Patent No.: US 10,831,292 B2
(45) Date of Patent: Nov. 10, 2020

(54) FORCE SENSITIVE TOUCH PANEL DEVICES

(71) Applicant: NEXTINPUT, INC., San Jose, CA (US)

(72) Inventors: Ian Douglas Campbell, San Jose, CA (US); Ryan Matthew Diestelhorst, Sunnyvale, CA (US)

(73) Assignee: NextInput, Inc., San Jose, CA (US)

( * ) Notice: Subject to any disclaimer, the term of this patent is extended or adjusted under 35 U.S.C. 154(b) by 0 days.

(21) Appl. No.: 15/500,986

(22) PCT Filed: Aug. 4, 2015

(86) PCT No.: PCT/US2015/043635
§ 371 (c)(1),
(2) Date: Feb. 1, 2017

(87) PCT Pub. No.: WO2016/022576
PCT Pub. Date: Feb. 11, 2016

(65) Prior Publication Data
US 2017/0220144 A1 Aug. 3, 2017

Related U.S. Application Data

(60) Provisional application No. 62/032,888, filed on Aug. 4, 2014.

(51) Int. Cl.
*G06F 3/041* (2006.01)

(52) U.S. Cl.
CPC ............ *G06F 3/041* (2013.01); *G06F 3/0414* (2013.01); *G06F 2203/04108* (2013.01)

(58) Field of Classification Search
CPC ................ G06F 3/041; G06F 2203/04108
See application file for complete search history.

(56) References Cited

U.S. PATENT DOCUMENTS

| 5,714,694 A * | 2/1998 | Diessner .................. G01L 1/26 73/862.632 |
| 5,854,625 A * | 12/1998 | Frisch .................. G06F 3/0414 345/173 |
| 7,190,350 B2 | 3/2007 | Roberts |

(Continued)

FOREIGN PATENT DOCUMENTS

WO 2014098946 A1 6/2014

OTHER PUBLICATIONS

International Search Report and Written Opinion of the International Searching Authority in corresponding PCT/US2015/043635, dated Dec. 8, 2015 (9 pages).

(Continued)

*Primary Examiner* — Nitin Patel
*Assistant Examiner* — Robert M Stone
(74) *Attorney, Agent, or Firm* — Meunier Carlin & Curfman LLC

(57) ABSTRACT

An example force sensitive touch panel device can include a device body; a touch surface for receiving a touch force; a sensor for sensing touch force that is arranged between the device body and the touch surface; and a membrane configured to mechanically isolate the device body and the touch surface. Additionally, the membrane can apply a preload force to the sensor.

27 Claims, 6 Drawing Sheets

(56) References Cited

U.S. PATENT DOCUMENTS

| | | | |
|---|---|---|---|
| 8,269,731 B2* | 9/2012 | Molne | G06F 1/169 |
| | | | 345/173 |
| 8,890,823 B2* | 11/2014 | Alameh | G06F 3/038 |
| | | | 345/173 |
| 9,032,818 B2 | 5/2015 | Campbell et al. | |
| 9,046,956 B2* | 6/2015 | Koizumi | G06F 3/0488 |
| 9,088,282 B2* | 7/2015 | Holenarsipur | H03K 17/955 |
| 9,348,414 B2* | 5/2016 | Kagayama | G06F 3/016 |
| 9,477,263 B2* | 10/2016 | Hotelling | G06F 1/1626 |
| 9,632,602 B2* | 4/2017 | Marwah | G06F 1/1643 |
| 9,658,721 B2* | 5/2017 | Beraud | B60K 37/00 |
| 9,846,454 B2* | 12/2017 | Takizawa | G06F 1/1626 |
| 2002/0149571 A1 | 10/2002 | Roberts | |
| 2002/0175836 A1* | 11/2002 | Roberts | G06F 3/0414 |
| | | | 341/34 |
| 2004/0057769 A1* | 3/2004 | Ward | G06F 3/0202 |
| | | | 400/481 |
| 2006/0250377 A1* | 11/2006 | Zadesky | G06F 1/1613 |
| | | | 345/173 |
| 2008/0062144 A1* | 3/2008 | Shahoian | G06F 1/1616 |
| | | | 345/173 |
| 2009/0066673 A1 | 3/2009 | Molne et al. | |
| 2010/0045612 A1* | 2/2010 | Molne | G06F 1/1626 |
| | | | 345/173 |
| 2010/0103640 A1* | 4/2010 | Brown | G06F 3/0414 |
| | | | 361/829 |
| 2010/0156844 A1* | 6/2010 | Paleczny | G06F 3/016 |
| | | | 345/174 |
| 2010/0220065 A1* | 9/2010 | Ma | G06F 3/016 |
| | | | 345/173 |
| 2011/0051334 A1 | 3/2011 | Griffith et al. | |
| 2012/0126959 A1* | 5/2012 | Zarrabi | B06B 1/0688 |
| | | | 340/407.1 |
| 2012/0162143 A1* | 6/2012 | Kai | G06F 1/1626 |
| | | | 345/177 |
| 2012/0200526 A1* | 8/2012 | Lackey | G06F 3/0414 |
| | | | 345/174 |
| 2012/0200789 A1* | 8/2012 | Molne | G06F 3/0414 |
| | | | 349/12 |
| 2012/0319966 A1* | 12/2012 | Reynolds | G06F 3/041 |
| | | | 345/173 |
| 2013/0016059 A1* | 1/2013 | Lowles | G06F 3/016 |
| | | | 345/174 |
| 2013/0162591 A1* | 6/2013 | Hidaka | H04M 1/0266 |
| | | | 345/174 |
| 2013/0286572 A1* | 10/2013 | Tsurusaki | G06F 3/045 |
| | | | 361/679.01 |
| 2013/0321321 A1* | 12/2013 | Hiraoka | G06F 3/016 |
| | | | 345/173 |
| 2013/0328820 A1* | 12/2013 | Kondoh | G06F 1/1656 |
| | | | 345/173 |
| 2013/0341741 A1 | 12/2013 | Brosh | |
| 2013/0341742 A1 | 12/2013 | Brosh | |
| 2015/0331517 A1* | 11/2015 | Filiz | G06F 3/0414 |
| | | | 345/173 |

OTHER PUBLICATIONS

EP App. No. 15830091.3, Communication pursuant to Article 94(3) EPC dated Mar. 21, 2019.
CN App. No. 201580050740.9, Notification of First Office Action dated Jun. 5, 2019.
Extended European Search Report dated Feb. 19, 2018 from corresponding EP App. No. 15830091.3.

* cited by examiner

FORCE SENSITIVE TOUCH PANEL DEVICES

CROSS-REFERENCE TO RELATED APPLICATIONS

This application claims the benefit of U.S. provisional patent application No. 62/032,888, filed on Aug. 4, 2014, and entitled "FORCE SENSITIVE TOUCH PANEL," the disclosure of which is expressly incorporated herein by reference in its entirety.

BACKGROUND

A variety of known interface devices permit touch input to electrical systems. These known interface devices, such as conventional resistive and capacitive touch panels, use manipulation of electrical properties of electrically conducting films to sense the location of a touch event.

Resistive touch panels, for example, measure the change in conductance or, conversely, resistance, of two opposing electrically conducting films as they are pressed together.

Capacitive touch panels, meanwhile, measure the change of capacitance between two opposing electrically conducing films when an electrically conductive object like a human finger comes in close proximity to the electrically conducting films.

Both resistive and capacitive touch panels provide very accurate means to sense touch locations, however each has inherent disadvantages. Resistive touch panels require the mechanical manipulation of two thin films directly above a display, which impacts display clarity and provides a means of mechanical wear of the films over time. Capacitive touch panels can only sense electrically conductive objects and cannot readily sense, for example, a gloved finger, a wet finger, or an inactive stylus. Neither technique can also detect force or pressure from a touch event with high resolution or repeatability.

Accordingly, there is a need in the pertinent art for a force-sensitive technique for sensing touch that does not rely on resistive or capacitive films, or which may be added to complement existing touch technology by adding force sensitivity.

SUMMARY

Force sensitive touch panel devices are described herein. The devices can be used to determine the location and magnitude of force or pressure, e.g., the vector $\{X, Y, F\}$, of touch events along a touch surface. This disclosure contemplates that the force sensitive touch panel devices can easily be produced in high volumes. In addition, the mechanical design of the force sensitive touch panel devices minimize erroneous touch measurements. Further, touch input data sensed by sensors of the force sensitive touch panel devices can be provided into a data processing system.

An example force sensitive touch panel device can include a device body; a touch surface for receiving a touch force; a sensor for sensing touch force that is arranged between the device body and the touch surface; a preload element configured to mechanically couple the device body, the touch surface, and the sensor; and a membrane configured to mechanically isolate the device body and the touch surface. Additionally, the preload element can apply a preload force to the sensor.

Additionally, the membrane can be arranged between the device body and the touch surface. For example, the membrane can optionally be arranged between the device body and at least a portion of an outer edge of the touch surface. Alternatively or additionally, the membrane can optionally be configured to provide a seal between the device body and the touch surface.

Optionally, the membrane can substantially restrict motion of the touch surface within a fixed plane. Additionally, the membrane can optionally allow freedom of motion of the touch surface orthogonal to the fixed plane.

Alternatively or additionally, the preload element can be further configured to maintain contact between the sensor and the device body and between the sensor and the touch surface.

Optionally, the preload element can be a tensile or compressive spring.

Alternatively or additionally, the preload force can be approximately equal to a significant percentage of a sensing range of the sensor.

Alternatively or additionally, the sensor can be configured to output a signal indicative of a force greater than the preload force in response to the touch force. Alternatively or additionally, the sensor can be configured to output a signal indicative of a force less than the preload force in response to the touch force. Additionally, the force sensitive touch panel device can optionally include a processor configured to determine a location and magnitude of the touch force. Optionally, the processor can be further configured to determine an action or response based on the location and magnitude of the touch force.

Alternatively or additionally, the force sensitive touch panel can include a plurality of sensors arranged between the device body and the touch surface. Additionally, the preload element can apply a respective preload force to each of the sensors.

Optionally, the sensor can be a force or pressure sensor.

Another example force sensitive touch panel device can include a device body for housing components of the force sensitive touch panel device; a touch surface for receiving a touch force; a sensor for sensing touch force arranged between the device body and the touch surface; and a preload element configured to mechanically couple the device body, the touch surface, and the sensor. Additionally, the preload element can apply a preload force to the sensor.

Alternatively or additionally, the preload element can be further configured to maintain contact between the sensor and the device body and between the sensor and the touch surface.

Optionally, the preload element can be a tensile or compressive spring.

Alternatively or additionally, the preload force can be approximately equal to a significant percentage of a sensing range of the sensor.

Alternatively or additionally, the sensor can be configured to output a signal indicative of a force greater than the preload force in response to the touch force. Alternatively or additionally, the sensor can be configured to output a signal indicative of a force less than the preload force in response to the touch force. Additionally, the force sensitive touch panel device can optionally include a processor configured to determine a location and magnitude of the touch force. Optionally, the processor can be further configured to determine an action or response based on the location and magnitude of the touch force.

Alternatively or additionally, the force sensitive touch panel can include a plurality of sensors arranged between the device body and the touch surface. Additionally, the preload element can apply a respective preload force to each of the sensors.

Optionally, the sensor can be a force or pressure sensor.

Yet another example force sensitive touch panel device can include a device body; a touch surface for receiving a touch force; a sensor for sensing the touch force arranged between the device body and the touch surface; and a membrane configured to mechanically isolate the device body and the touch surface. The membrane can apply a preload force to the sensor.

Additionally, the membrane can be arranged between the device body and the touch surface. Alternatively or additionally, the membrane can optionally be configured to provide a seal between the device body and the touch surface.

Optionally, the membrane can substantially restrict motion of the touch surface within a fixed plane. Additionally, the membrane can optionally allow freedom of motion of the touch surface orthogonal to the fixed plane.

Alternatively or additionally, the preload force can be approximately equal to a significant percentage of a sensing range of the sensor.

Alternatively or additionally, the sensor can be configured to output a signal indicative of a force greater than the preload force in response to the touch force. Alternatively or additionally, the sensor can be configured to output a signal indicative of a force less than the preload force in response to the touch force. Additionally, the force sensitive touch panel device can optionally include a processor configured to determine a location and magnitude of the touch force. Optionally, the processor can be further configured to determine an action or response based on the location and magnitude of the touch force.

Alternatively or additionally, the force sensitive touch panel device can optionally include an overload spring element for providing overload protection for the sensor.

Alternatively or additionally, the force sensitive touch panel can include a plurality of sensors arranged between the device body and the touch surface. Additionally, the membrane can apply a respective preload force to each of the sensors.

Optionally, the sensor can be a force or pressure sensor.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described with respect to example force sensitive touch panel devices, it will become evident to those skilled in the art that the implementations are not limited thereto.

Figure 1:
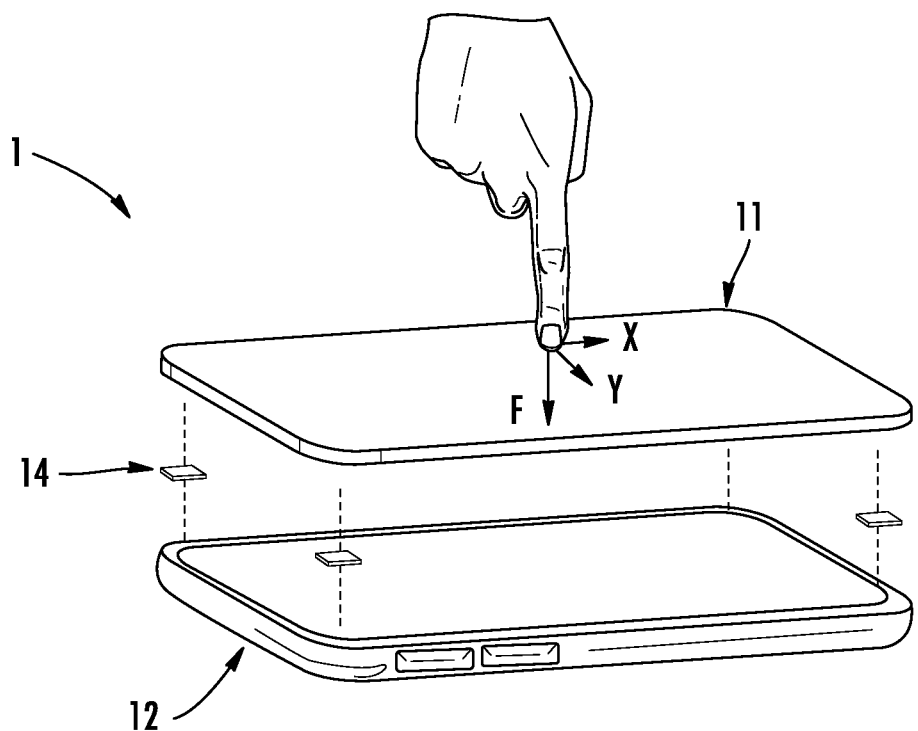
FIG. 1 is an exploded isometric view of an example force sensitive touch panel device.

Force sensitive touch panel devices for measuring the locations (or origins, points, etc.) {X, Y} and magnitudes {F} of forces from touch events along a touch surface are described herein. The force sensitive touch panel devices can optionally be an electronic device having a touch-sensitive human machine interface ("HMI"). Optionally, the force sensitive touch panel devices can be a consumer electronic device such as a tablet computer or mobile phone, for example. In one aspect, as depicted in FIG. 1, the force sensitive touch panel device 1 includes a touch surface 11 defining a contact surface for receiving one or more forces F which occur at some point {X, Y} along the contact surface. The touch surface 11 can optionally be formed of a rigid or minimally flexible material including, but not limited to, glass, metal, plastic, or combinations thereof. It is contemplated that the touch surface 11 can have any shape, such as, for example and without limitation, a substantially square shape, a substantially rectangular shape, a substantially elliptical shape, and the like, Additionally, the force sensitive touch panel device 1 can include a device body 12. It should be understood that the device body 12 houses various components of the force sensitive touch panel device 1 including, but not limited to, one or more sensors 14, processing circuitry, power source (e.g., a battery), etc. The device body 12 can optionally be formed of a sufficiently rigid material to protect the various components of the force sensitive touch panel device 1 including, but not limited to, materials such as metal, plastic, or combinations thereof.

As described above, the force sensitive touch panel device 1 can include one or more sensors 14. For example, the force sensitive touch panel device 1 can optionally include four sensors, with one sensor arranged near each corner of the force sensitive touch panel device 1. This disclosure contemplates that the force sensitive touch panel device 1 can include more or less than four sensors. Additionally, it should be understood that the arrangement of the sensors can be different than the arrangement depicted in FIG. 1, which is provided only as an example. The sensors 14 can be arranged between the touch surface 11 and the device body 12. Each of the sensors 14 can be a force or pressure sensor. For example, each of the sensors 14 can be a piezoresistive, piezoelectric or capacitive sensor. For example, the sensors 14 can be configured to change at least one electrical characteristic (e.g., resistance, charge, capacitance, etc.) based on an amount or magnitude of an applied force and can output a signal proportional to the amount or magnitude of the applied force. Alternatively or additionally, the sensors 14 can be a microelectromechanical ("MEMS") sensor. For example, the sensors 14 can optionally be a MEMS sensor as described in U.S. 2013/0341741 to Brosh, entitled "Ruggedized MEMS Force Die," U.S. 2013/0341742 to Brosh, entitled "Wafer Level MEMS Force Dies," or U.S. 9,032,818 to Campbell et al., entitled "Microelectromechanical Load Sensor and Method of Manufacturing the Same." It is further contemplated that the forces F from a touch event will be substantially transmitted to one or more sensors 14. The signals from the one or more sensors 14 can then be used by a processor to calculate the location(s) and magnitude(s) of forces acting along the touch surface 11. For example, the signals output by the one or more sensors 14 can be processed (e.g., converted from analog-to-digital signals, amplified, filtered, and/or otherwise processed) and communicated to a processor (e.g., the processing unit depicted in FIG. 8) of the force sensitive touch panel device. Additionally, the location(s) and magnitude(s) of forces as determined by the processor can be used to select actions or responses of the force sensitive touch panel device.

Figure 2:
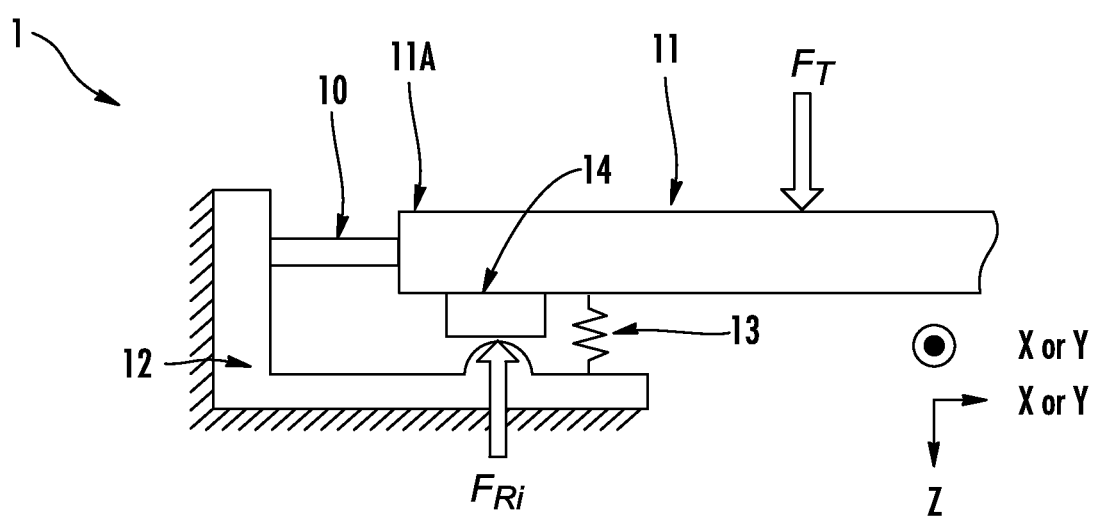
FIG. 2 is a cross sectional view near one sensor of the device shown in FIG. 1 depicting an ideal free body diagram of the device in operation.
Figure 3:
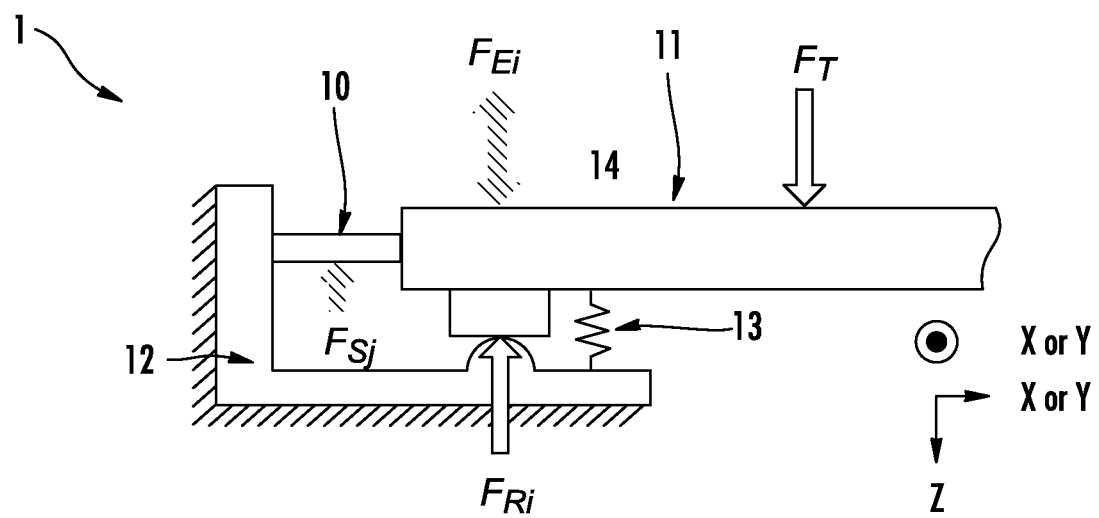
FIG. 3 is a cross sectional view near one sensor of the device shown in FIG. 1 depicting a practical or non-ideal free body diagram of the device in operation.

Referring now to FIGS. 2 and 3, the force sensitive touch panel device 1 can also include a preload element 13. The preload element 13 mechanically couples the touch surface 11, the device body 12, and the sensor 14. For example, the preload element 13 can optionally be a tensile or compressive spring. The preload element 14 can be attached to each of the touch surface 11 and the device body 12 in order to ensure that the sensor 14 and the device body 14, as well as the sensor 14 and the touch surface 11, remain in contact, even in the presence of varying mechanical flexure, thermal contraction and expansion, and/or other external environmental changes. Optionally, in some implementations, one or more intermediate layers can be provided between the touch surface 11 and the sensor 14, and the preload force ensures that the sensor 14 remains in contact with the intermediate layer(s) such that forces are transferred from the touch surface 11 to the sensor 14. Optionally, the sensor 14 contacts a raised portion of the device body 12 as depicted in FIGS. 2 and 3. Additionally, the preload element 13 applies a preload force to the sensor 14. It is contemplated that the preload element 13 can be selected/designed such that the preload force is a predetermined force within a sensing range of the sensor 14 (i.e., a point between the lowest and highest forces detectable by the sensor 14). Optionally, in some implementations, the preload force can be approximately equal to a significant percentage of a functional sensing range of the sensor. For example, the preload element 13 can apply a force that activates the sensor 14 up to a significant portion of its functional sensing range (e.g., 10-50% of the functional sensing range). As used herein, the preload force is referred to as the neutral set point, which is the force sensed by the sensor 14 in the absence of a touch force being applied to the touch surface 11.

In some implementations, as depicted in FIGS. 2 and 3, the force sensitive touch panel device 1 can include a membrane 10. The membrane 10 can be formed from materials including, but not limited to, polymer or thin metal. The membrane 10 mechanically isolates the device body 12 and the touch surface 11. As depicted in FIGS. 2 and 3, the membrane 10 is arranged between the device body 12 and the touch surface 11. For example, the membrane 10 can optionally be arranged between the device body 12 and at least a portion of an outer edge 11A of the touch surface 11. Optionally, the membrane 10 can optionally be fixed or attached to at least a portion of each of the device body 12 and the touch surface 11. Additionally, in some implementations, the membrane 10 can optionally be configured to provide a seal between the device body 12 and the touch surface 11. It is contemplated that such a seal isolates the inside of the force sensitive touch panel device 1 from the external environment. In addition, the membrane 10 can optionally substantially restrict motion of the touch surface 11 within a fixed plane (e.g., the X-Y plane in FIGS. 1-2). Additionally, the membrane 10 can optionally allow freedom of motion of the touch surface 11 orthogonal to the fixed plane (e.g., in a positive or negative direction along the Z-axis in FIG. 2 or 3). Further, as described below, the membrane 10 aids in reducing shunt forces that may be introduced during assembly of the force sensitive touch panel device 1.

FIG. 2 depicts an ideal free body diagram of the force sensitive touch panel device 1 depicted in FIG. 1. When a touch force, $F_T$, is applied to the touch surface 11, a reaction force, $F_{Ri}$, is experienced by the one or more sensors 14. in FIG. 2, the preload element 13 (e.g., a tensile spring) applies a tensile force bringing the touch surface 11 and the one or more sensors 14 together with the device body 12, such that these components are always in contact even in the presence of varying mechanical flexure, thermal contraction and expansion, and/or other external environmental changes. Additionally, the membrane 10 captures the touch surface 11 in the X/Y plane while allowing full freedom of motion of the touch surface 11 in either direction along the Z axis.

As described above, the preload force applied to the sensor 14 can be large enough to activate the sensor 14 to a significant portion of its functional sensing range. It is further contemplated that forces (e.g., touch force $F_T$) acting along the touch surface 11 can either increase or relieve stress on the sensor 14. When stress is increased, the force sensed by the sensor 14 increases greater than the neutral set point, Sensed forces greater than the neutral set point are referred to below as positive force data. When stress is relieved, the force sensed by the sensor 14 decreases less than the neutral set point. Sensed forces less than the neutral set point are referred to below as negative force data. It should be understood that signals output by the sensor 14 can be processed (e.g., converted from analog-to-digital signals, amplified, filtered, and/or otherwise processed) and communicated to a processor (e,g., the processing unit depicted in FIG. 8) of the force sensitive touch panel device. Both positive and negative force data from the sensor 14 can be used by a processor to calculate the origin and magnitude of forces acting along the touch surface 11, It should be understood that methods or techniques known in the art for calculating the origin and magnitude of forces acting along a touch surface can be implemented by the processor.

FIG. 3 depicts a practical free body diagram of the force sensitive touch panel device 1 depicted in FIG. 1. As depicted in FIG. 3, mechanical assembly methods introduce a set of j shunt forces, $F_{Sj}$, which reduce the total reaction forces, $F_{Ri}$, experienced by the sensor 14. In addition, flexure and/or thermal contraction and expansion of the device body 12 introduce erroneous forces, $F_{Ei}$, which can be in the positive or negative direction along the Z-axis. During assembly, clearances are provided between all mechanical parts in order to minimize shunt forces, $F_{Sj}$. As described above, providing the membrane 10 is an effective way to mechanically capture the touch surface 11 in the X/Y plane while providing necessary freedom of motion in either direction along the Z-axis.

Figure 4:
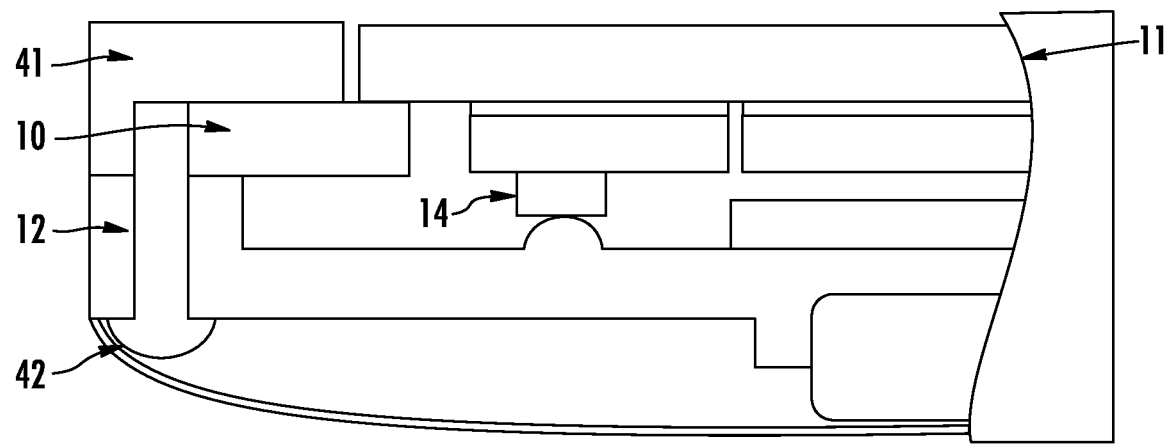
FIG. 4 is a cross view near a sensor of another example force sensitive touch panel device.

FIG. 4 depicts a cross view near a sensor of another example force sensitive touch panel device. Similar to FIGS. 1-3, the force sensitive touch panel device can include a touch surface 11, a device body 12, a sensor 14 arranged between the device body 12 and the touch surface 11, and a membrane 10 configured to mechanically isolate the device body 12 and the touch surface 11. The touch surface 11, the device body 12, and the sensor 14 are described in detail above and are therefore not described further below. In FIG. 4, the membrane 10 applies a preload force to the sensor 14. As described above, the preload force is a predetermined force within a sensing range of the sensor 14 (i.e., a point between the lowest and highest forces detectable by the sensor 14). Optionally, in some implementations, the preload force can be approximately equal to a significant percentage of a functional sensing range of the sensor. For example, the membrane 10 can apply a force that activates the sensor 14 up to a significant portion of its functional sensing range (e.g., 10-50% of the functional sensing range).

Optionally, the membrane 10 can be clamped between the device body 12 and a top enclosure 41 using a fastener 42. It is also contemplated that the membrane 10 can be clamped between the device body 12 and the top enclosure by means other than using a fastener, which is provided only as an example. Additionally, as described above, the membrane 10 can optionally be fixed or attached to at least a portion of each of the device body 12 and the touch surface 11. It is further contemplated that clamping the membrane 10 between the device body 12 and the top enclosure 41 can provide a preload force to the sensor 14. Additionally, in some implementations, the membrane 10 can optionally be configured to provide a seal between the device body and the touch surface. It is contemplated that such a seal isolates the inside of the force sensitive touch panel device from the external environment. In addition, the membrane 10 can optionally substantially restrict motion of the touch surface 11 within a fixed plane (e.g., the X-Y plane in FIGS. 1-2). Additionally, the membrane 10 can optionally allow freedom of motion of the touch surface 11 orthogonal to the fixed plane (e.g., the Z-axis in FIG. 2 or 3). Further, as described above, the membrane 10 aids in reducing shunt forces that may be introduced during assembly of the force sensitive touch panel device 1.

Figure 5:
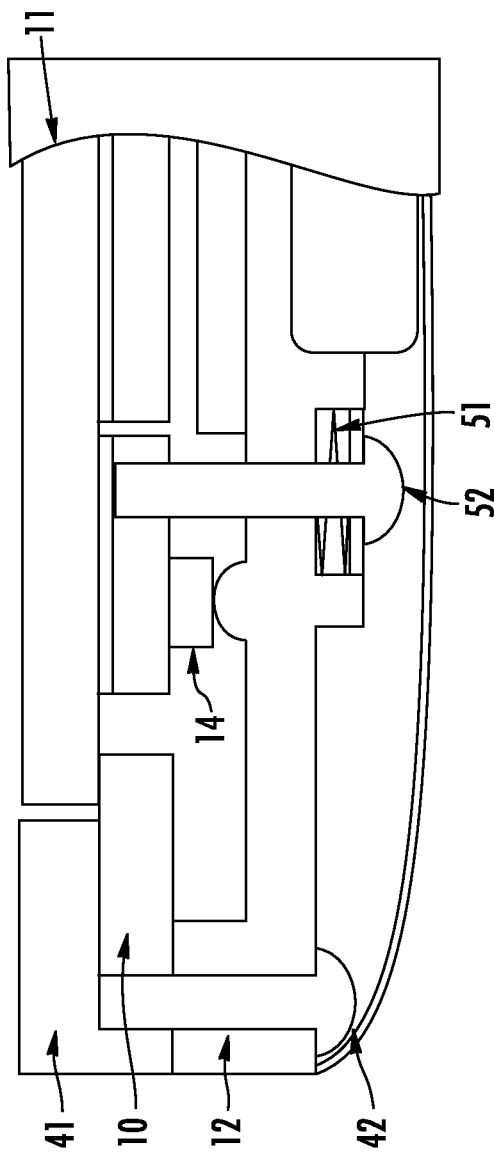
FIG. 5 is a cross view near a sensor of yet another example force sensitive touch panel device.

FIG. 5 depicts a cross view near a sensor of yet another example force sensitive touch panel device. Similar to FIG. 4, the force sensitive touch panel device can include a touch surface 11, a device body 12, a sensor 14 arranged between the device body 12 and the touch surface 11, and a membrane 10 configured to mechanically isolate the device body 12 and the touch surface 11. The membrane 10 is clamped between the device body 12 and the top enclosure 41 using the fastener 42. The touch surface 11, the device body 12, the sensor 14, the membrane 10, the top enclosure 41, and the fastener 42 are described in detail above and are therefore not described further below. In FIG. 5, a spring element 51 is used to provide preload to the sensor 14. The spring element 51 is a compression spring fixed to the device body 12 using a fastener 52. Although FIG. 5 depicts a compression spring, it should be understood by those familiar with the art that a tensile spring could be used in a similar manner.

For each of the embodiments described above, the location (e.g., the x location, y location) and the magnitude (e.g., the force, f) of a touch point can be calculated using the following technique:

Let $F_{iR}$=Raw force value at sensor i,
Let $F_{iP}$=Preloaded force value at sensor i,
let $F_{iS}$=Scaled force value at sensor i, where $F_{iS}=F_{iR}-F_{iP}$ $$x = \frac{\begin{bmatrix}F_{1S}\\F_{2S}\\F_{3S}\\F_{4S}\end{bmatrix}\begin{bmatrix}0&0&0&0\\0&1&0&0\\0&0&0&0\\0&0&0&1\end{bmatrix}}{\sum_1^4 F_{iS}}, y = \frac{\begin{bmatrix}F_{1S}\\F_{2S}\\F_{3S}\\F_{4S}\end{bmatrix}\begin{bmatrix}0&0&0&0\\0&0&0&0\\0&0&1&0\\0&0&0&1\end{bmatrix}}{\sum_1^4 F_{iS}}, f = \sum_1^4 F_{iS}$$

Figure 6:
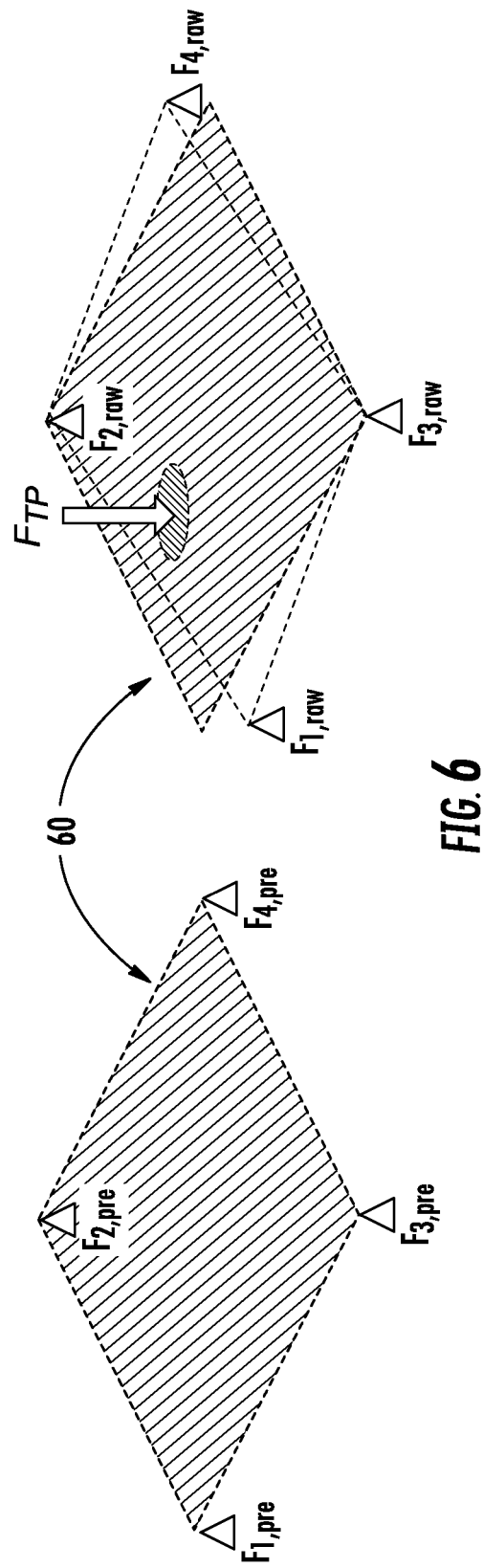
FIG. 6 shows conceptually how positive and negative forces can be created by a touch (e.g., $F_{TP}$) on a preloaded plane.

As described above, because the sensor 14 is preloaded, the sensor 14 can sense a positive or negative value for $F_{iS}$. For example, when stress is increased, the force sensed by the sensor 14 increases greater than a neutral set point (e.g., $F_{iP}$). When stress is relieved, the force sensed by the sensor 14 decreases less than the neutral set point (e.g., $F_{iP}$). Allowing for negative force data to be utilized in the touch point location and magnitude calculations enables achievement f higher accuracy. FIG. 6 shows conceptually how positive and negative forces can be created by a touch (e.g., $F_{TP}$) on a preloaded touch plane 60 (e.g., a touch surface).

Figure 7:
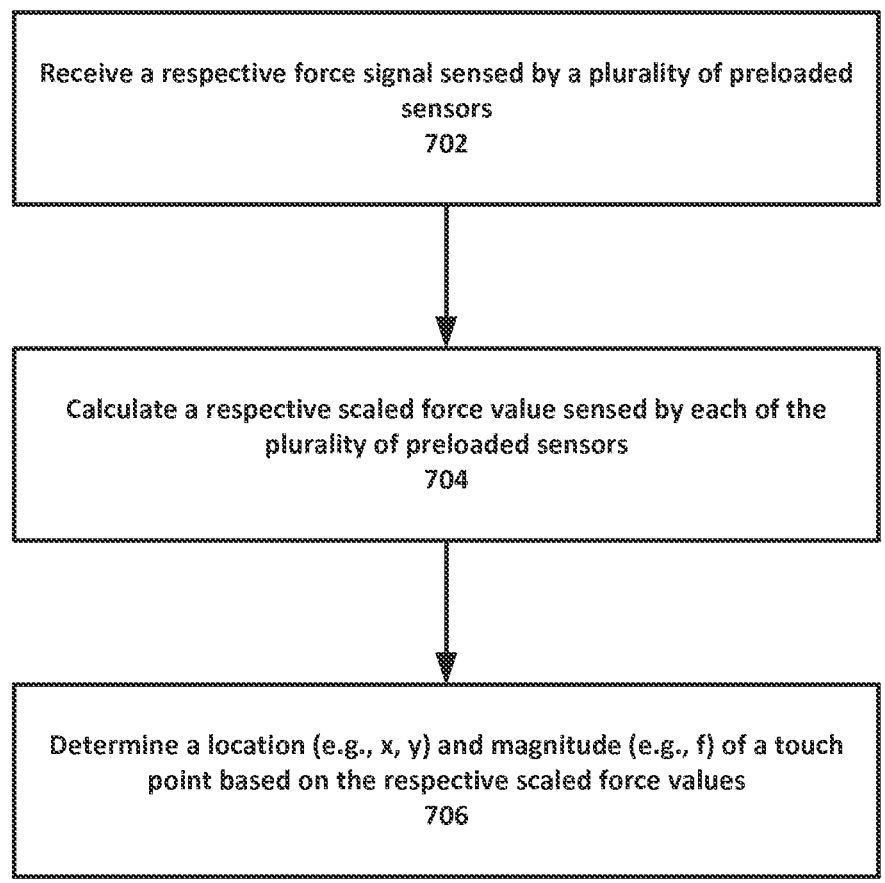
FIG. 7 is a flow diagram illustrating ample operations for determining the location and magnitude of an applied force.

Referring now to FIG. 7, a flow diagram illustrating example operations for determining the location and magnitude of an applied force is described. At 702, a respective force signal sensed by a plurality of preloaded sensors is received. It is contemplated that the preloaded sensors can be sensors of any of the devices described above with regard to FIGS. 1-5, for example. At 704, a respective scaled force value sensed by each of the plurality of preloaded sensors is calculated. For example, as described above, a scaled force value (e.g., $F_{iS}$) at a sensor can be calculated as the difference between the raw force value at the sensor (e.g., $F_{iR}$) and the preload force at the sensor (e.g., $F_{iP}$) as follows: $F_{iS}=F_{iP}-F_{iP}$. Then, at 706, a location (e.g., x, y) and magnitude (e.g., f) of a touch point can be determined based on the respective scaled force values as follows:

$$x = \frac{\begin{bmatrix}F_{1S}\\F_{2S}\\F_{3S}\\F_{4S}\end{bmatrix}\begin{bmatrix}0&0&0&0\\0&1&0&0\\0&0&0&0\\0&0&0&1\end{bmatrix}}{\sum_1^4 F_{iS}}, y = \frac{\begin{bmatrix}F_{1S}\\F_{2S}\\F_{3S}\\F_{4S}\end{bmatrix}\begin{bmatrix}0&0&0&0\\0&0&0&0\\0&0&1&0\\0&0&0&1\end{bmatrix}}{\sum_1^4 F_{iS}}, f = \sum_1^4 F_{iS}.$$

It should be appreciated that the logical operations described herein with respect to the various figures may be implemented (1) as a sequence of computer implemented acts or program modules (i.e., software) running on a computing device (e.g., the computing device described in FIG. 8), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 8:
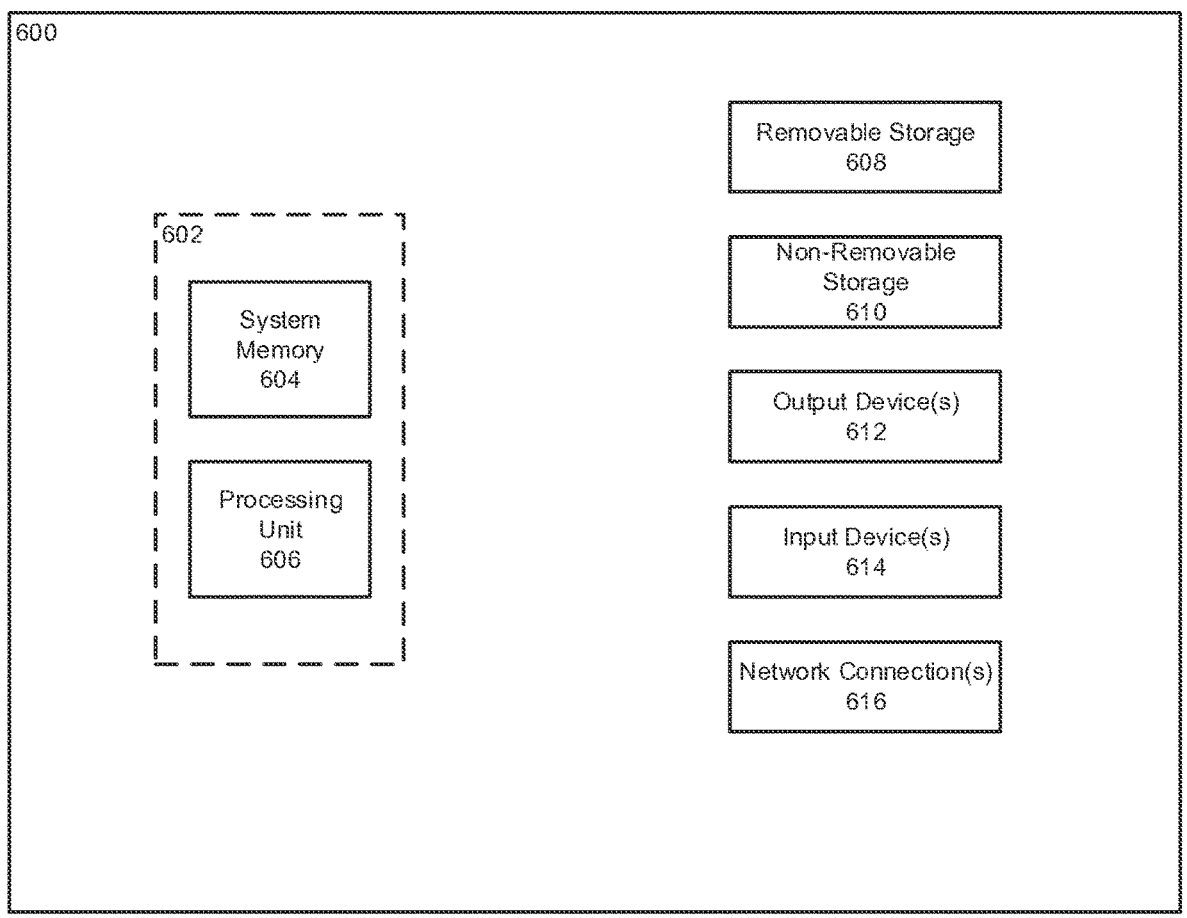
FIG. 8 is an example computing device.

Referring to FIG. 8, an example computing device 600 upon which embodiments of the invention may be implemented is illustrated. It should be understood that the example computing device 600 is only one example of a suitable computing environment upon which embodiments of the invention may be implemented. Optionally, the computing device 600 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 600 typically includes at least one processing unit 606 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 8 by dashed line 602. The processing unit 606 may be a standard programmable processor that performs arithmetic and logic operations necessary for operation of the computing device 600. The computing device 600 may also include a bus or other communication mechanism for communicating information among various components of the computing device 600.

Computing device 600 may have additional features/functionality. For example, computing device 600 may include additional storage such as removable storage 608 and non-removable storage 610 including, but not limited to, magnetic or optical disks or tapes. Computing device 600 may also contain network connection(s) 616 that allow the device to communicate with other devices. Computing device 600 may also have input device(s) 614 such as a keyboard, mouse, touch screen, etc. Output device(s) 612 such as a display, speakers, printer, etc. may also be included. The additional devices may be connected to the bus in order to facilitate communication of data among the components of the computing device 600. All these devices are well known in the art and need not be discussed at length here.

The processing unit 606 may be configured to execute program code encoded in tangible, computer-readable media. Tangible, computer-readable media refers to any media that is capable of providing data that causes the computing device 600 (i.e., a machine) to operate in a particular fashion. Various computer-readable media may be utilized to provide instructions to the processing unit 606 for execution. Example tangible, computer-readable media may include, but is not limited to, volatile media, non-volatile media, removable media and non-removable media implemented in any method or technology for storage of information such as computer readable instructions, data structures, program modules or other data. System memory 604, removable storage 608, and non-removable storage 610 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 606 may execute program code stored in the system memory 604. For example, the bus may carry data to the system memory 604, from which the processing unit 606 receives and executes instructions. The data received by the system memory 604 may optionally be stored on the removable storage 608 or the non-removable storage 610 before or after execution by the processing unit 606.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A force sensitive touch panel device, comprising:
a device body;
a touch panel having a contact surface, the contact surface for receiving one or more touch forces;
a membrane clamped between a first portion of the device body and a top enclosure with the membrane abutting a portion of the touch panel other than the contact surface, wherein the membrane is configured to mechanically isolate the device body and the touch panel;

a plurality of sensors arranged between a second portion of the device body and the touch panel, the respective sensors being directly connected to the touch panel, entirely separated from the membrane and configured to sense the one or more touch forces;

a preload element connected to a raised portion of the second portion of the device body that applies a respective preload force to each of the plurality of sensors, wherein the respective sensors output respective signals indicative of a force greater than, or less than, the preload force exerted on the respective sensors from the device body, the respective signals being in response to the touch forces on the mechanically isolated touch panel.

2. The force sensitive touch panel device of claim 1, wherein the membrane is arranged between the first portion of the device body and at least a portion of an outer edge of the touch panel.

3. The force sensitive touch panel device of claim 1, wherein the membrane is configured to provide a seal between the first portion of the device body and the touch panel.

4. The force sensitive touch panel device of claim 1, wherein the membrane substantially restricts motion of the touch panel within a fixed plane.

5. The force sensitive touch panel device of claim 4, wherein the membrane allows freedom of motion of the touch surface orthogonal to the fixed plane.

6. The force sensitive touch panel device of claim 1, wherein the membrane is further configured to maintain direct contact between the respective sensors and the second portion of the device body and between the respective sensors and the touch panel.

7. The force sensitive touch panel device of claim 1, wherein the preload force is approximately equal to a significant percentage of a respective sensing range of the respective sensors.

8. The force sensitive touch panel device of claim 1, wherein one or more of the plurality of sensors is configured to output the respective signal, wherein the respective signal is indicative of a force greater than the preload force set by the preload element in response to the touch force.

9. The force sensitive touch panel device of claim 1, wherein one or more of the plurality of sensors is configured to output the respective signal, wherein the respective signal is indicative of a force less than the preload force in response to the touch force.

10. The force sensitive touch panel device of claim 1, further comprising a processor configured to determine a location and magnitude of the touch force.

11. The force sensitive touch panel device of claim 10, wherein the processor is further configured to determine an action or response based on the location and magnitude of the touch force.

12. The force sensitive touch panel device of claim 1, wherein at least one of the plurality of sensors is a strain sensor.

13. A force sensitive touch panel device, comprising:
a device body;
a touch panel having a contact surface and a second surface opposite the contact surface, wherein the contact surface is positioned for receiving one or more touch forces;

a plurality of sensors arranged between a second portion of the device body and the second surface of the touch panel, the respective sensors being configured to sense the touch forces;

a membrane connected to the device body and an outer edge of the touch panel, other than the contact surface or the second surface such that the membrane is entirely separated from the respective sensors and configured to separate a first portion of the device body from the touch panel and the contact surface, wherein the membrane is further configured to apply a first preload force to the plurality of sensors;

a preload element connected to a raised portion of the device body that applies a respective preload force to each of the plurality of sensors;

wherein the respective sensors output respective signals indicative of a force greater than, or less than, the respective preload force exerted on the respective sensors from the device body, the respective signals being in response to the touch forces on the mechanically isolated touch panel.

14. The force sensitive touch panel device of claim 13, wherein the membrane is configured to provide a seal between the device body and the touch panel.

15. The force sensitive touch panel device of claim 13, wherein the membrane substantially restricts motion of the touch panel within a fixed plane.

16. The force sensitive touch panel device of claim 15, wherein the membrane allows freedom of motion of the touch panel orthogonal to the fixed plane.

17. The force sensitive touch panel device of claim 13, wherein the preload element is further configured to maintain contact between the sensor and the device body and between the sensor and the touch panel.

18. The force sensitive touch panel device of claim 13, wherein the preload element comprises a tensile or compressive spring.

19. The force sensitive touch panel device of claim 13, wherein the respective preload force is approximately equal to a significant percentage of a sensing range of the respective sensors.

20. The force sensitive touch panel device of claim 13, wherein one or more of the plurality of sensors is configured to output the respective signal, wherein the respective signal is indicative of a force greater than the respective preload force set by the preload element in response to the touch forces.

21. The force sensitive touch panel device of claim 13, wherein one or more of the plurality of sensors is configured to output the respective signal, wherein the respective signal is indicative of a force less than the preload force in response to the touch forces.

22. The force sensitive touch panel device of claim 13, further comprising a processor configured to determine a location and magnitude of the respective touch forces.

23. The force sensitive touch panel device of claim 22, wherein the processor is further configured to determine an action or response based on the location and magnitude of the respective touch forces.

24. The force sensitive touch panel device of claim 13, wherein at least one of the plurality of sensors is a force or pressure sensor.

25. A method for determining a touch point on a touch panel secured proximately to a device body of a force sensitive touch panel device, comprising:
preloading a plurality of sensors arranged between a raised portion of the device body and a second surface of the touch panel, wherein the sensors are configured to sense a touch force on a contact surface of the touch panel, wherein the preloading comprises:
connecting a membrane to the device body and an outer edge of the touch panel, other than the contact surface or the second surface, the membrane being entirely separated from the plurality of sensors; and
positioning a preload element relative to the raised portion of the device body and the touch surface but mechanically isolated from the contact surface, the preload element implementing the preloading of the plurality of sensors to form a plurality of preloaded sensors;

outputting, from the plurality of sensors, respective signals indicative of a force greater than, or less than, a respective preload force exerted on respective sensors from the device body, the respective signals being in response to the touch force on the mechanically isolated touch panel;

receiving a respective force signal sensed by the plurality of preloaded sensors;

calculating a respective scaled force value sensed by each of the plurality of preloaded sensors; and determining a location and magnitude of a touch point based on the respective scaled force values.

26. The method of claim 25, wherein one or more of the preloaded force sensors senses a force less than a preload force.

27. The method of claim 25, wherein one or more of the preloaded force sensors senses a force greater than a preload force.

\* \* \* \* \*